Oct. 8, 1968  G. W. PROFFITT, JR  3,404,615
MIRROR AND SHUTTER MECHANISM FOR SINGLE LENS REFLEX
PHOTOGRAPHIC CAMERA
Filed Jan. 10, 1966  2 Sheets-Sheet 1
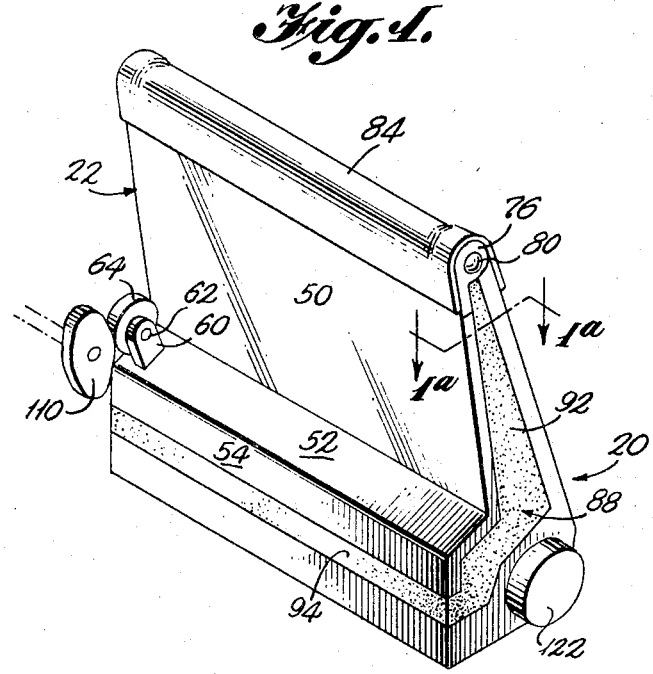
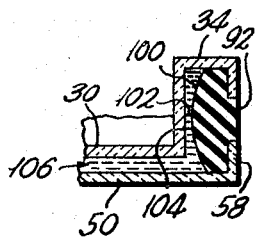
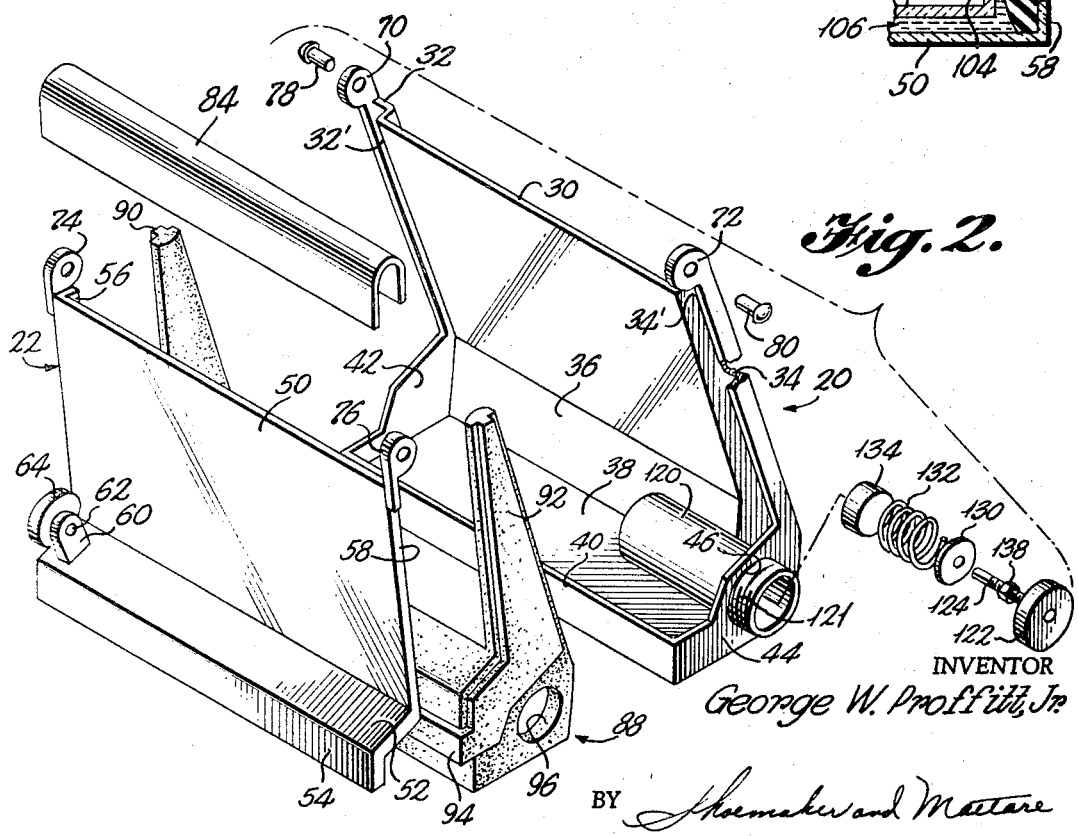
INVENTOR
George W. Proffitt, Jr.
BY Shoemaker and Mattare
ATTORNEYS

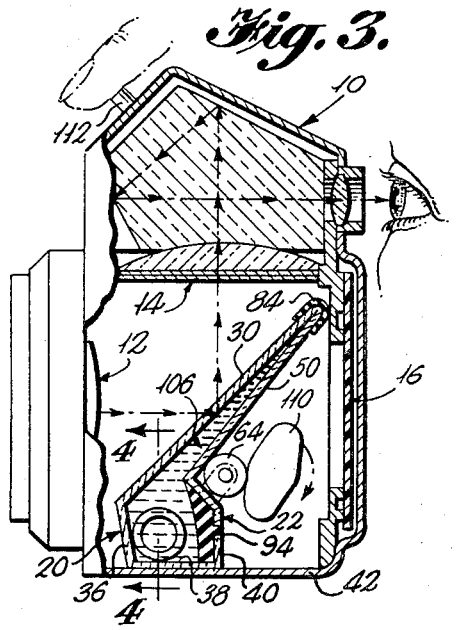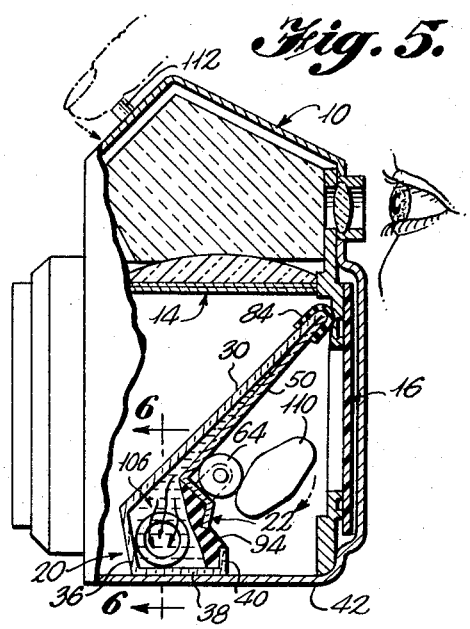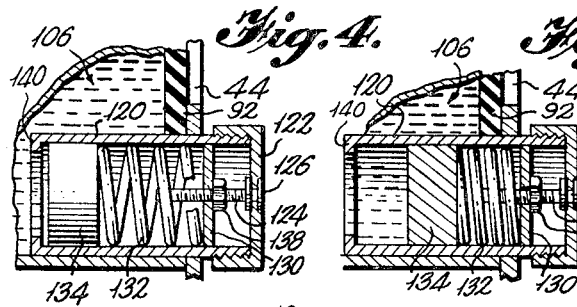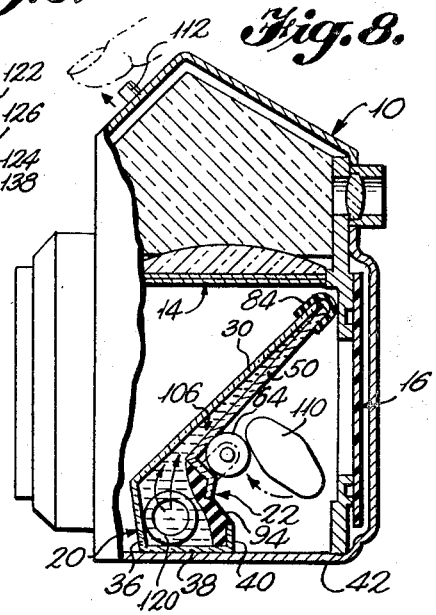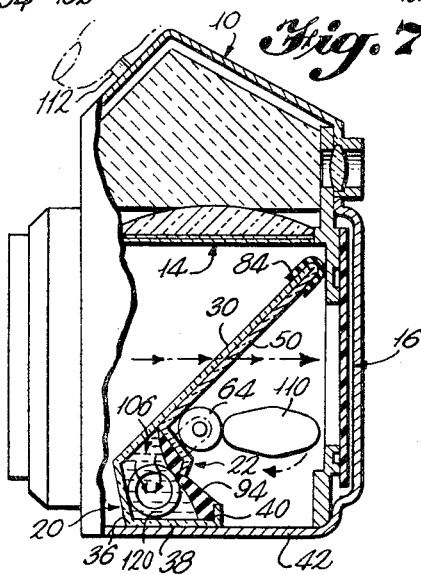

United States Patent Office 3,404,615
Patented Oct. 8, 1968

3,404,615
MIRROR AND SHUTTER MECHANISM FOR SINGLE LENS REFLEX PHOTOGRAPHIC CAMERA
George W. Proffitt, Jr., 1310 N. Oak St., Apt. 406,
Arlington, Va. 22209
Filed Jan. 10, 1966, Ser. No. 519,562
1 Claim. (Cl. 95—42)

ABSTRACT OF THE DISCLOSURE

The mirror and shutter mechanism includes a pair of transparent portions and a body of light reflective flowable material such as mercury, positioned between the transparent portions. One of the portions is fixed and the other is movable towards and away from the first portion. A flow control device is provided for controlling the flow of the fluid between the portions. When the mercury is disposed between the transparent portions, the structure operates as a mirror in order to reflect the image onto the view finder. When it is desired to take a picture, the movable transparent portion is moved towards the fixed portion to release the mercury from the space between the portions. When the mercury is so displaced, the light rays may pass directly through the two portions and be directed onto the film.

---

The present invention relates to a new and novel single lens reflex photographic camera arrangement, and more particularly to such a camera incorporating an unique mirror and shutter mechanism.

For many years, the 35 mm. range finder type cameras were predominant in the camera field. It was recognized during this period that the single lens reflex camera offered a basic advantage in providing parallax-free viewing and composing through the taking lens itself which enabled the photographer to see the picture in the same manner as it would appear on the film.

These early single lens reflex cameras employed a moving mirror mounted at a 45 degree angle between the lens and the film. This moving mirror normally reflects the image to the view finder, and is adapted to flip up out of the way when the picture is taken so that the light rays strike the film. The early models of this arrangement were rather primitive in form, and this type of arrangement has been greatly improved down through the years. Nevertheless, even in its most sophisticated present-day form, the moving mirror type of 35 mm. single lens reflex cameras still suffer from basic design problems which are unavoidable with this type of construction.

The moving mirror strikes the camera body at its upper and lower limits of travel thereby causing undesirable noise and vibration. The noise limits the utility of this type of construction in many indoor situations, and the vibration contributes to image degradation, particularly at slow shutter speeds.

This type of arrangement also creates lens designing complications arising out of the increased back focus required to make room for the swinging mirror. This problem affects the shorter focal lengths, and has necessitated the development of special retrofocus lenses, which are more expensive, less sharp, and more prone to aberrations than conventional designs.

In addition darkening of the viewing image from telephoto lenses occurs due to the fact that some of the edge rays are not caught by the bottom edge of the mirror. This problem becomes progressively worse as focal length increases, and cannot be solved without further aggravating the lens design problems as discussed above.

Additionally, focusing errors arise due to failure of the mirror to return to the exact same position each time it is moved. Even a very slight deviation in the angular position of the mirror can cause the image focused on the ground glass to be at considerable variance with that recorded on the film. Yet, the speed at which the mirror must move makes it extremely difficult to assure its return to exactly the same position after each exposure.

A suggested solution to the problems involved with moving mirror arrangements has been the provision of a semi-transparent beam-splitter mirror or pellicle which both reflects and transmits light. This type of arrangement is adapted to divide the light received from the objective means between the view finder and the film, this type of mirror remaining in a fixed position behind the lens.

The beam-splitter mirror arrangement has not proved satisfactory in the art because of the inherent disadvantage of this arrangement that any light made available to the view finder must be "stolen" from the film and vice versa. Accordingly, this type of arrangement generally leads to a construction wherein the camera provides bright viewing but very long exposures, or on the other hand, rather dim viewing with short exposures; but no matter how the light is divided with this type of arrangement, it is impossible to send all the light both to the view finder and to the film.

In the present invention, an unique mirror and shutter mechanism is provided which overcomes the disadvantages occurring both with the moving mirror and the beam-splitter mirror arrangements of the prior art, and which at the same time offers the advantages of each of these arrangements. In the present invention, a pair of transparent portions are provided, one of these portions being fixed and the other being movable toward and away from the first transparent portion. A body of light reflective flowable material such as mercury is positioned between the transparent portions, and flow control means is provided for controlling the flow of the mercury between the transparent portions. Suitable sealing means is provided for confining the flowable material between the transparent portions.

With this arrangement, when the mercury is disposed between the two transparent portions, the structure operates as a mirror, one of the transparent portions being positioned at a 45 degree angle to the light rays passing through the objective means so as to reflect the light rays from the mercury in contact with its rear surface to the view finder means.

When it is desired to take a picture, the movable transparent portion is moved toward the fixed transparent portion to expel the mercury from the space between these portions. When the mercury is so displaced, the structure no longer acts as a mirror, and the light rays may pass directly through the two transparent portions and thereby be directed on the film.

It is accordingly apparent that the combined mirror and shutter means operates alternately as a mirror and a shutter to thereby perform a dual function. This is a novel concept in this art and obviously results in considerable savings in cost and substantially simplifies the structure of the camera.

The movable transparent portion of the present invention moves only a very small distance, and such movement is actually cushioned to a certain extent by the mercury which is disposed between the transparent portions. Accordingly, the apparatus of the present invention will operate quite quietly and with substantially no vibration. Since space is not required to allow the mirror mechanism to swing through an angle of 45 degrees as in the conventional moving mirror arrangement, lenses with much shorter back focus can be successfully mounted.

The arrangement of the present invention also substantially eliminates the problem of darkening of the viewing image from a telephoto lens. Additionally, focusing errors caused by failure of the conventional swinging mirror to return to the correct position are eliminated since the present invention includes a fixed transparent portion which will remain in the same relationship to the view finder means at all times.

It will accordingly be apparent that the present invention, for all practical purposes, eliminates the significant deficiencies of previous mirror designs. As compared with the beam-splitter type arrangement of the prior art, substantially greater brilliance will be provided to the film with the arrangement of the present invention, and the brilliance in the view finder will be approximately twice as good as that obtainable with presently existing beam-splitter arrangements, which normally divert about 30% of the light to the view finder, and transmit the remaining 70% to the film.

As compared with the swinging mirror type of construction, the present invention in the viewing mode suffers from the slightly inferior reflectivity of mercury as compared to the silver used in swinging mirrors, and from the fact that light must pass through the front transparent portion twice, whereas swinging mirrors are silvered on the front surface.

In the picture-taking mode, the light must pass through two transparent portions in the present invention which are less transmissive than the completely open air space left between the lens and film after a swinging mirror has moved out of the light path.

However, calculations indicate that compared to a front-silvered swinging mirror, the present arrangement would suffer no more than a 30% loss of light to the view finder and no more than a 15% loss to the film. Neither of these losses is large enough to make any practical difference in actual picture-taking situations.

While the reduced reflectivity of the mirror is theoretically great enough to be just barely noticeable, it will be offset, particularly with the longer focal lengths, by the larger reflecting area of the full-length mirror of the present design. The much smaller loss in light transmitted to the film is even less significant, being far below the tolerances within which the best of present-day films and light meters can be held.

Insofar as the sutter function of the present invention is concerned, the total travel required by the movable transparent portion is approximately $1/10$ of that required with a conventional moving mirror arrangement. Accordingly, a corresponding decrease in the cycling time is afforded, so that speeds on the order of $1/500$ of a second are easily attainable, thereby enabling the arrangement of the present invention to effectively operate as a shutter, whereas the swinging mirror arrangements of the prior art have a maximum obtainable speed which limits the total movement thereof to approximately $1/50$ of a second. Accordingly, it has been necessary to fit conventional single lens reflex cameras with a swinging mirror with conventional shutters borrowed from the developed technology of the range finder camera, these conventional shutters cycling while the mirror is at the upper limit of its travel.

In the present invention, only a thin layer of mercury is required between the transparent portions so that the movement of the transparent portions relative to one another may be quite small. It is desirable to reduce the travel of the movable transparent portion to the practical minimum since this also decreases the inertial mass of mercury to be moved.

In the present invention, the relatively inexpensive clockwork mechanism of a leaf shutter arrangement may be employed for controlling the actuating means of the present invention, while the actual shutter leaf assembly may be eliminated. Accordingly, complete freedom of lens interchangeability may be obtained as with the more expensive focal-plane shutters as employed in the prior art. Additionally, with the arrangement of the present invention, it is not necessary to synchronize a shutter with a separate mirror.

Furthermore, with the arrangement of the present invention, it will be possible to fit a completely automatic exposure-setting mechanism to a professional type camera having unrestricted lens interchangeability. Heretofore, such interchangeability has been restricted to cameras with focal-plane shutters; yet it has thus far been found impossible to fit such shutters with completely automatic exposure-setting mechanisms. By combining the major advantages of the focal-plane shutter with the easily automated clockwork of a leaf shutter, the present invention overcomes this problem.

A further important feature of the present invention is the fact that the apparatus must not be dependent upon a particular orientation of the camera. It must be capable of operating through a full 360 degrees with respect to its axes. This is accomplished in the present invention by providing a construction wherein the transparent portions are movable relative to one another so that they can be moved to a position adjacent one another to expel the mercury from between the transparent portions thereof. The mercury, which does not wet glass and which has a natural tendency to shrink away from it, is readily expelled into another portion of the apparatus. A flow control means is provided including means for causing the transparent portions to move toward and away from one another and further means is provided which applies a substantially continuous pressure to the body of mercury so that regardless of the position of the transparent portions, the mercury will be urged into such a position as to fill the space between the transparent portions when they are spaced from one another.

An object of the present invention is to provide a single lens reflex photographic camera including a mechanism which serves the functions of both a mirror and shutter and which eliminates conventional shutter problems and substantialy reduces the cost of the camera.

Another object of the present invention is to eliminate certain inherent disadvantages of swinging mirror type reflex cameras such as noise, vibration, lens designing complications, darkening of the viewing image from telephoto lenses, and focusing errors.

Still another object of the invention is to provide a combined mirror and shutter mechanism for a single lens reflex photographic camera which provides increased brilliance to the view finder and film as compared to conventional beam-splitter mirror arrangements.

Another object of the invention is to provide a mirror and shutter mechanism for a single lens reflex photographic camera which is operable in all positions of the camera so that the apparatus will operate effectively regardless of the orientation of the structure.

Still another object of the invention is to provide a single lens reflex camera wherein it is possible to fit a completely automatic exposure-setting mechanism to a professional type camera having unrestricted lens interchangeability.

A still further object of the invention is to provide a novel mirror and shutter mechanism for a single lens reflex photographic camera which is quite simple and inexpensive in construction, and yet which at the same time is quite efficient and reliable in operation.

Other objects and many attendant advantages of the invention will become more apparent when considered in connection with the specification and accompanying drawings, wherein:

FIG. 1 is a top perspective view of the combined mirror and shutter mechanism of the present invention;

FIG. 1a is a sectional view taken substantially along line 1a—1a of FIGURE 1 looking in the direction of of the arrows;

FIG. 2 is an exploded perspective view of the components of the structure shown in FIG. 1;

FIG. 3 is a view partly in section through a camera employing the arrangement of the present invention;

FIG. 4 is a sectional view taken substantially along line 4—4 of FIG. 3 looking in the direction of the arrows;

FIG. 5 is a view similar to FIG. 3 illustrating a different phase of the operation of the apparatus;

FIG. 6 is a sectional view taken substantially along line 6—6 of FIG. 5 looking in the direction of the arrows;

FIG. 7 is a view similar to FIG. 3 illustrating a still further phase of the operation of the apparatus; and FIG. 8 is a further view similar to FIG. 3 illustrating still another phase of the operation of the apparatus.

Referring now to the drawings wherein like reference characters designate corresponding parts throughout the several views, the combined mirror and shutter mechanism of the present invention is illustrated as incorporated in a typical single lens reflex photographic camera, it being noted that the details of construction of the camera itself may be of a relatively conventional nature and are shown for the purpose of illustration only. It will be readily recognized by one skilled in the art that the mirror and shutter mechanism of the present invention may be employed with any suitable camera mechanism.

In the illustrated embodiment, the camera includes a casing indicated generally by reference numeral 10, and an objective assembly being indicated generally by reference numeral 12, and being supported within an opening provided at the left-hand side of the casing as seen in the drawings. The view finder means is indicated generally by reference numeral 14 and is supported at the upper portion of the camera in the usual manner whereby an image reflected from the mirror and shutter mechanism may be viewed through the view finder means. The film is indicated by reference numeral 16.

The combined mirror and shutter means of the present invention includes a first transparent portion indicated generally by reference numeral 20 and a second transparent portion indicated generally by reference numeral 22. As seen most clearly in FIG. 2, the transparent portion 20 includes a first generally planar portion 30 which includes flanges 32 and 34 at opposite sides thereof of generally U-shaped cross sectional configuration to define channel portions 32' and 34' within the flanges 32 and 34 respectively. The portion 30 joins with a lower wall portion 36 which in turn is formed integral with a bottom wall portion 38. This bottom wall portion 38 is joined with a back wall portion 40 extending vertically upwardly therefrom. A pair of side wall portions 42 and 44 are provided at the lower end of the flange portions 32 and 34 respectively and extend between these flange portions and the bottom wall portion 38 and the rear wall portion 40. A generally circular hole 46 is provided in side wall portion 44 for a purpose hereinafter described.

The second transparent portion 22 includes a generally planar wall portion 50 which joins with an angularly related wall portion 52 which in turn joins with a downwardly extending wall portion 54. A pair of flanges 56 and 58 extend normally from opposite sides of the planar wall portion 50 and cooperate with the flange portions 32 and 34 of member 20 for holding the associated sealing means in the proper operative position relative thereto as will be hereinafter more fully described.

A lug 60 extends upwardly from wall portion 52 and a pin 62 is supported from the upper portion of the lug 60 and rotatably supports thereon a roller 64 which comprises a portion of the actuating means hereinafter described.

A first pair of hinge members 70 and 72 are mounted at the upper side edges of wall portion 30 of the first transparent portion 20, these hinge members having suitable holes provided therethrough. A similar pair of hinge members 74 and 76 are provided at the upper side edges of the wall portion 50 of the second transparent portion 22, these hinge members also having suitable holes formed therethrough. A first pin 78 is adapted to extend through the aligned holes provided in hinge members 70 and 74, and a second pin 80 is adapted to extend through the aligned holes formed in hinge members 72 and 76 for pivotally interconnecting the first and second transparent portions to one another.

It should be noted at this point that the two wall portions 30 and 50 of the two transparent portions are subsantially planar and are of such configuraion so as to be complementary to one another whereby one wall portion may be disposed in close juxtaposition with the other wall portion. In referring to the members 20 and 22 as being transparent portions, it will of course be apparent that it is essential that the complementary portions 30 and 50 thereof be transparent, whereas the remaining lower portions thereof need not be necessarily transparent, although it is considered most feasible to make these two portions 20 and 22 as integral members formed of homogeneous material throughout. In a typical example, members 20 and 22 may be formed of optical glass.

A sealing means 84 is provided for sealing the upper edges of wall portions 30 and 50 with respect to one another. This sealing means may comprise a flexible member formed of rubber or similar material which is suitably bonded to the adjacent parts of the transparent portions 20 and 22 as by cementing opposite edges of the sealing member 84 to the corresponding transparent portions. Sealing means 84 may comprise a one-piece homogeneous fitting, fitting over the entire upper portion of the apparatus and having its inner surface shaped to conform exactly to the hinges and the other features of the upper portion of the apparatus so that an impermeable seal will be provided completely along this upper portion.

A sealing gasket means of resilient material such as rubber or the like is indicated generally by reference numeral 88, this sealing gasket means being adapted to seal the remaining spaces between the two transparent portions. As noted particularly in FIG. 2, the sealing gasket means 88 may comprise an integral body including a first gasket portion 90 adapted to seal the space between one side edge of the two transparent portions, while an opposite gasket portion 92 is adapted to seal the space between the opposite side edges of the transparent portions. A lower gasket portion 94 is adapted to seal the space between the upper edge of the rear wall 40 of transparent portion 20 and the lower edge of the lowermost wall portion 54 of transparent portion 22. It will be apparent from an inspection of FIG. 2 that the sealing gasket 88 is of such configuration as to fit snugly within the two transparent portions when they are disposed in the operative relationship shown in FIG. 1 so as to completely seal the associated spaces between the two transparent portions. The sealing gasket means 88 may be suitably secured to the adjacent parts of the transparent portions as by cementing them in place or the like. Gasket means 88 is also provided with a hole 96 aligned with the hole 46 previously described.

Referring now to FIG. 1a, it will be noted that when the sealing gasket is in place with the portion 92 thereof filling the space between adjacent edges of the two transparent portions, the inner surface 100 of the sealing gasket portion is spaced from the adjacent inner surface 102 of the flange portion 34 to provide a space or channel 104 extending throughout the length of the flange portion 34. This inner surface 100 of the sealing gasket portion is preferably of arcuate cross sectional configuration as clearly seen in FIG. 1a. This channel 104 is adapted to receive a portion of the body of light reflective flowable material such as mercury indicated generally by reference numeral 106. In a similar manner, a channel for receiving mercury is provided between the inner surface of the gasket portion at the opposite side of the apparatus so as to provide a channel similar to channel 104 within the flange portion 32 for receiving mercury. The presence of mercury within these so-formed channels assists in separating the two transparent portions from one another after they have been moved into juxtaposition while making an exposure.

The flow control means of the present invention includes an actuating means comprising a cam 110 mounted for rotation about a suitable axis, this cam being interconnected with a suitable shutter release button indicated by reference numeral 112. Any suitable conventional interconnection between the button 112 and the cam 110 will be suitable for operating the apparatus, it being noted that cam 110 is of the type including a pair of diametrically opposite lobes, and that a complete cycle of operation of the apparatus of the present invention will occur during each 180 degrees of rotation of the cam.

It will be noted that the cam is adapted to engage roller 64 which in turn is operatively associated with transparent portion 22 as previously described for moving the transparent portion 22 as hereinafter set forth. It should be noted that the cam and roller arrangement for actuating the apparatus is purely for the purpose of illustration, and that varous other types of operating mechanism may be employed as will be apparent to one skilled in the art. For example, a solenoid or magnet arrangement may be employed, or a hydraulic system may also be utilized for causing movement of the transparent portions relative to one another. The transparent portions may be counterbalanced in such a manner as to require only a small amount of force, and the actuating means may also be so arranged that the two transparent portions are normally urged toward one another and positively moved apart in contrast to the arrangement illustrated. In any event, it is obvious that any suitable operating means may be employed.

It should additionally be noted that any suitable sealing means may be provided for sealing the two transparent portions with respect to one another and for confining the flowable material between the transparent portions. One possible alternative is to provide an arrangement wherein the transparent portions may be constructed similar to that shown in the drawings and wherein the adjacent edge portions of the transparent portions may be interconnected by relatively thin integral glass portions along the edges thereof so as to form the seal. Various other arrangements will occur to those skilled in the art. An advantage of the arrangement shown is that the gasket means 88, which may be formed of sponge rubber or similar material, may also serve as a means for cushioning the movement of the transparent portions toward one another and for further normally urging them apart so that they will normally be positioned in the operative relationship shown in FIGS. 1 and 3.

The body of light reflective flowable material preferably comprises mercury, although any other suitable material of similar characteristics may be employed. The body of mercury is indicated by reference numeral 106 throughout the drawings, it being understood that the entire space between the transparent portions will ordinarily be filled with the body of mercury.

The flow control means of the present invention also includes means which defines a space for receiving flowable material in the form of a cylinder 120 which is suitably fixed within the holes 46 and 96 previously described in the side wall of first transparent portion 20 and the sealing gasket 88. Cylinder 120 is provided with a threaded outer end portion 121 which is adapted to receive a threaded cap member 122 thereon.

An elongated threaded bolt 124 has the end portion 126 thereof fixed to cap 122. Bolt 124 extends through a disc-like member 130 which is slidably positioned within the bore in cylinder 120 which has a central hole for receiving the bolt. A compression spring 132 is interposed between one side of member 130 and a piston member 134 which is freely slidably positioned within the bore of cylinder 120. A lock nut 138 is threaded on bolt 124. This lock nut is adapted to control the position of disc-like member 130 within cylinder 120 and to thereby adjust the spring pressure applied by spring 132 to piston 134. It is apparent that the lock nut 138 controls the amount of space between the disc-like member 130 and the threaded cap 122. It will also be noted as seen in FIGS. 4 and 6 that the inner end of cylinder 120 is provided with an annular radially inwardly extending flange portion 140 for limiting inward movement of the piston 134. Other suitable means of applying pressure, such as lining the lower portion of the apparatus with an elastic material similar to that used in the sealing means, or bisecting the lower portion of the apparatus with an elastic membrane backed by compressed air, will occur to one skilled in the art. An advantage of the arrangement shown is that it provides a convenient means of adjusting internal pressure to the required value after the apparatus has been assembled and filled with mercury. In any event, it is obvious that any suitable means of maintaining pressure on the mercury may be employed.

*Operation*

Referring now particularly to FIGS. 3–8 of the drawings, the operation of the apparatus will be most clearly understood. As seen in FIG. 3, the system is shown at rest wherein the combined mirror and shutter means is operating as a mirror. Roller 64 is in engagement with a low point on the cam 110 and the movable second transparent portion 22 is disposed at its maximum distance from the first transparent portion 20. These two transparent portions are illustrated as being relatively widely spaced for the purpose of illustration, although in a practical embodiment the two transparent wall portions 30 and 50 may be angularly related to one another at an angle less than the approximately 4½ degrees shown in the illustration.

With the apparatus in the position shown in FIG. 3, piston 134 is at its innermost limit of travel and the compression spring through the intermediary of piston 134 applied pressure to the body of mercury 106 so that the entire space between the complementary wall portions 30 and 50 is filled with mercury so as to form a mirror surface. All light entering through the objective assembly is reflected from the surface of the mercury adjacent portion 30 upwardly to the view finder means 14. It will also be noted that the combined mirror and shutter means is so interrelated within the camera that in the position shown in FIG. 3, an effective light seal is provided throughout the body of the camera so that no light may strike the film 16.

Turning now to FIG. 5, the shutter release button 122 is pressed downwardly to actuate the cam 110. As the cam starts to rotate, it moves roller 64 and movable transparent portion 22 toward the fixed transparent portion 20 which is fixedly mounted with respect to the lower wall portion 42 of the camera. As transparent portion 22 pivots toward transparent portion 20, mercury is squeezed out from between the complementary wall portions 30 and 50, urging mercury downwardly into the lower space between the transparent portions and into the expansion chamber defined by the bore within cylinder 120. The piston is moved to the right into the position shown in FIG. 6 as a volume of mercury equivalent to that expelled from between wall portions 30 and 50 is received within the bore of cylinder 120, spring 132 being compressed as this takes place. The mirror surface begins to thin out as the mercury is expelled from between the two transparent portions.

Turning now to FIG. 7, the roller 64 is in engagement with a high point on the cam 110, and the two wall portions 30 and 50 have been moved into direct contact with one another, thereby expelling all of the mercury from between these wall portions. This will of course cause the piston 134 to move even further to the right from the position shown in FIG. 7 to receive a volume of mercury equivalent to that which has been forced from between the two transparent portions. In the position shown in FIG. 7, light entering the camera through the objective assembly will pass directly through the wall portions 30 and 50 and strike the film 16, and no light will be reflected upwardly to the view finder means.

After the desired exposure interval, cam 110 resumes its rotation in a clockwise direction and moves into the position shown in FIG. 8. As the roller 64 now travels to a lower point on the cam 110, the spring 132 will urge piston 134 back to the left within its cylinder as seen in FIGS. 4 and 6 which causes the mercury to move out of the cylinder 120 and back between the wall portions 30 and 50 of the two transparent portions. As this space between the two transparent portions is again filled with mercury, the mirror surface is reformed, ending the exposure by cutting off all light from the film and again reflecting it to the view finder. When the cam reaches the second low point after completing one-half of a revolution, the cycle is complete and the system is once again at rest.

It is apparent from the foregoing that there is provided according to the present invention a novel combined mirror and shutter mechanism for single lens reflex photographic cameras wherein the apparatus can effectively operate as both a mirror and a shutter resulting in a considerable decrease in cost. The arrangement of the present invention reduces noise and vibration to a minimum and eliminates certain inherent disadvantages of moving mirror type single lens reflex cameras such as lens designing complications, darkening of the viewing image from a telephoto lens, and focusing errors. Additionally, the present invention provides improved brilliance to the view finder and film as compared with conventional beam-splitter mirror arrangements. The apparatus can effectively operate as a shutter due to the fact that the total movement of the movable transparent portion with respect to the other transparent portion is relatively small, and may be on the order of 9 degrees or less for a complete cycle. Additionally, a large passageway is provided for movement of mercury between the position it occupies when the apparatus is operating as a mirror and that position it occupies when the apparatus is operating as a shutter mechanism, and is allowing light to pass to the film during an exposure. An important feature of the present invention is the fact that the apparatus may be operated in any position regardless of the orientation of the structure. With this arrangement, it is possible to fit a completely automatic exposure-setting mechanism to a professional type camera having unrestricted lens interchangeability. The mirror and shutter mechanism of the present invention is quite simple and inexpensive in construction, and yet at the same time is quite efficient and reliable in operation.

As this invention may be embodied in several forms without departing from the spirit or essential characteristics thereof, the present embodiment is therefore illustrative and not restrictive, and since the scope of the invention is defined by the appended claim, all changes that fall within the metes and bounds of the claim or that form its functional as well as conjointly cooperative equivalents are therefore intended to be embraced by that claim.

I claim:

1. In a single lens reflex photographic camera, a combined mirror and shutter means comprising a first transparent portion and a second transparent portion, said first and second transparent portions being movable relative to one another and including complementary portions, a body of light reflective flowable material disposed between said first and second portions and adapted to fill the space between said complementary portions, said body of material being flowable to a position so that the space between said complementary portions is free of material and the complementary portions may be moved to a position adjacent one another, means for controlling the flow of said material, said camera including a casing, objective means supported by said casing, said combined mirror and shutter means being positioned within said casing to receive light from said objective means, said camera including view finder means, said combined mirror and shutter means being adapted to either reflect light rays to said view finder means or to pass light rays to film supported by the camera, said first transparent portion being fixed relative to the camera and said second transparent portion being mounted for pivotal movement toward and away from said first transparent portion, sealing means for sealing the space between said transparent portions to confine said body of flowable material between said transparent portions, said body of light reflective flowable material comprising mercury, said flow control means including actuating means for controlling the movement of said second transparent portion toward and away from said first transparent portion, means defining a space for receiving a portion of said flowable material, and a movable member movably mounted within said space, resilient means normally urging said movable member in one direction to apply substantially continuous pressure to said flowable material tending to move said flowable material between said transparent portions and said movable member being movable in another direction so as to allow the flowable material to flow out from between said transparent portions while a corresponding amount of material flows into said space.

References Cited

UNITED STATES PATENTS 2,481,660   9/1949   Harrison _____ 350—267 XR

NORTON ANSHER, *Primary Examiner.*

GARY M. HOFFMAN, *Assistant Examiner.*